United States Patent
Nair

(10) Patent No.: US 10,410,140 B1
(45) Date of Patent: Sep. 10, 2019

(54) CATEGORICAL TO NUMERIC CONVERSION OF FEATURES FOR MACHINE LEARNING MODELS

(71) Applicant: Amazon Technologies, Inc., Seattle, WA (US)

(72) Inventor: Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 489 days.

(21) Appl. No.: 15/239,739

(22) Filed: Aug. 17, 2016

(51) Int. Cl.
*G06N 5/02* (2006.01)
*G06N 5/04* (2006.01)
*G06N 20/00* (2019.01)

(52) U.S. Cl.
CPC ............. *G06N 20/00* (2019.01); *G06N 5/02* (2013.01); *G06N 5/04* (2013.01)

(58) Field of Classification Search
CPC .................................. G06N 5/02; G06N 5/04
See application file for complete search history.

(56) References Cited

U.S. PATENT DOCUMENTS

| | | | | |
|---|---|---|---|---|
| 8,909,564 B1 * | 12/2014 | Kaplow | ................. | G06N 5/043 706/12 |
| 9,141,916 B1 * | 9/2015 | Corrado | ................ | G06N 3/0454 |
| 2014/0156566 A1 * | 6/2014 | Kabiljo | .................. | G06Q 30/02 706/12 |
| 2016/0171534 A1 * | 6/2016 | Linden | ............... | G06Q 30/0255 705/14.53 |
| 2017/0262926 A1 * | 9/2017 | High | .................. | G06K 7/10712 |

OTHER PUBLICATIONS

"From Categorical to Numerical: Multiple Transitive Distance Learning and Embedding," Kai Zhang, Qiaojun Wang, Zhengzhang Chen, Ivan Marsic, Vipin Kumar, Guofei Jiang, Jie Zhang, Proceedings of the 2015 SIAM International Conference on Data Mining, eISBN: 978-1-61197-401-0 (Year: 2015).*
"Distance functions for categorical and mixed variables," Brendan McCane, Michael Albert, Department of Computer Science, University of Otago, New Zealand, Available online Feb. 6, 2008 (Year: 2008).*
"Utilizing Related Products for Post-Purchase Recommendation in E-commerce," Jian Wang, Badrul Sarwar, and Neel Sundaresan, RecSys'11, Oct. 23-27, 2011, Chicago, Illinois, USA, 2011 ACM 978-1-4503-0683-6/11/10 (Year: 2011).*
Pedregosa, et al. Scikit-learn: Machine Learning in Python, JMLR 12, pp. 2825-2830 (Oct. 2011).

* cited by examiner

*Primary Examiner* — Hal Schnee
(74) *Attorney, Agent, or Firm* — Knobbe, Martens, Olson & Bear, LLP

(57) ABSTRACT

Systems and methods are provided for learning and using a linear machine learning model, where the training data includes a categorical variable. After encoding the categorical variable, a computing system can learn a linear machine learning model. From the linear machine learning model, the computing system can construct a numeric variable. The numeric variable can be used in computing a prediction result and in learning a new linear machine learning model.

18 Claims, 5 Drawing Sheets

CATEGORICAL TO NUMERIC CONVERSION OF FEATURES FOR MACHINE LEARNING MODELS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as a linear machine learning model such as a linear regression model. A machine learning algorithm such as a linear regression or a linear classification algorithm can be used to learn a machine learning model. The parameters of a machine learning model can be learned in a process referred to as training. For example, the parameters of a linear machine learning model can be learned using training data such as historical data that includes input data and the correct or preferred output of the model for the corresponding input data. A linear machine learning model may be a suitable model when the training data includes large scale historical data. However, a linear machine learning model may require training data to be numeric or binary even though the historical data may include categorical variables representing categorical features that can be predictive of the output of the linear machine learning model.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
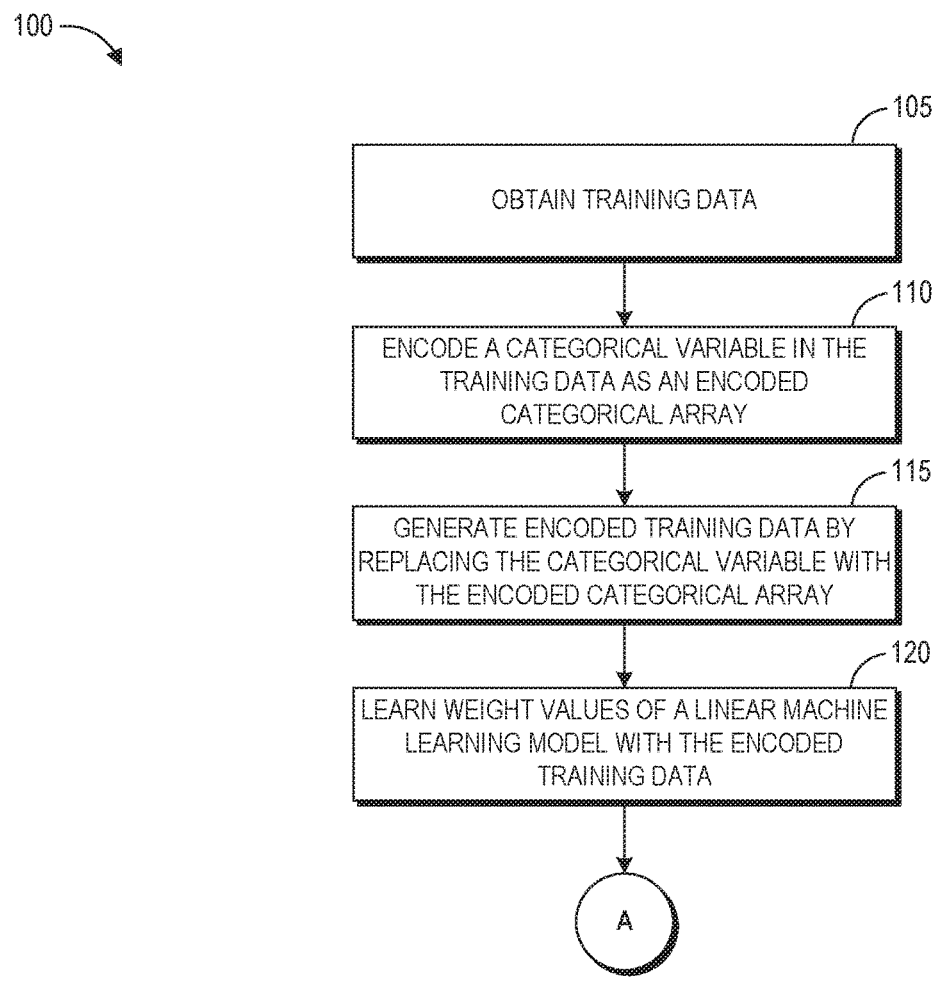
FIG. 1 is a flow diagram depicting an illustrative method for encoding a categorical variable and learning a linear machine learning model with the encoded categorical variable.

Generally described, aspects of the present disclosure relate to learning and using machine learning models, such as a linear machine learning model, by constructing a numeric variable C' from a categorical variable C. Traditionally, categorical variables representing categorical features may be excluded from many types of machine learning models because of the complexity of modeling categorical variables. In contrast, aspects of the present disclosure, according to some embodiments, enable constructing a numeric variable C' from a categorical variable C once and using the numeric variable C' in further training and prediction.

Training data may be used to learn a machine learning model to construct a numeric variable C'. Training data may include a training data input vector and a corresponding reference data output value. The training data input vector, as disclosed herein, may include a categorical variable C. A categorical variable representing a categorical feature may generally take a number of different values within a category, where the values may have no obvious numerical representation (such as colors, names, titles, etc.), may represent buckets or ranges of numbers, or may be in a numeric form that is not intended to represent a number itself (such as mailing ZIP codes). As one example, the categorical variable C can include an acquisition history of a user including one or more of recency, frequency, or monetary elements, as will be described in more detail below. In this example, the corresponding reference data output value can include a subsequent acquisition history of the user with respect to at least one of recency, frequency, or monetary behavior. Accordingly, a corresponding model learned from such data can be used to predict spending behavior of one or more individuals.

The categorical variable C may have a value selected from a plurality of categorical variable values, for example, $\{c_1; c_2; \ldots ; c_n\}$. According to known methods, the categorical variable C can be encoded as an encoded categorical array with n array elements, where each element is assigned to zero other than whichever element represents the selected categorical value in a given instance. However, encoding the categorical variable C as multiple array elements makes training the machine learning model regularly complicated because of the complexity of the resulting machine learning model.

Each array element of the encoded categorical array may correspond to one of the plurality of categorical variable values. For example, the first array element of the encoded categorical array can correspond to the categorical variable value $c_1$, the second array element can correspond to the categorical variable value $c_2$, and the nth array element can correspond to the categorical variable value $c_n$. If the categorical variable C has a value of $c_1$, the first array element of the encoded categorical array has a value of one while all other array elements of the encoded categorical array have values of zero.

To generate encoded training data for learning a machine learning model, the value of the categorical variable C can be replaced with the encoded categorical array. A machine learning algorithm, such as a linear regression algorithm, can be used to learn a machine learning model, such as a linear regression model, from the encoded training data. The machine learning model can include weight values. Learning the machine learning model can include learning the weight values of the machine learning model, such as the weight values $\{w_1; w_2; \ldots ; w_n\}$. A weight value of the machine learning model can correspond to one of the categorical variable values. For example, the weight value $w_1$ can correspond to the categorical variable value $c_1$. If some or a majority of the categorical variable values of the categorical variable C do not correlate to a target value to great extents, then their corresponding weight values, which are some or a majority of the weight values, may have small or zero values. L1 regularization can be used to induce sparsity at the level of the weight values. Categorical variable values that do not correlate to a target variable to great extents may be forced to values of zero and removed. A statistical significance between the target variable and the categorical variable can be a measure of the correlation between the target variable and the categorical variable.

However, L1 regularization may not induce sparsity at feature level (with sparsity at feature level, weight values corresponding to all categorical variable values of the categorical variable C can be forced to zero and the categorical variable C can be removed).

Once the weight values of the machine learning model are learned, a numeric variable C' corresponding to the categorical variable C can be constructed. For example, the numeric variable C' has a value of $w_1$ if the categorical variable C has a value of $c_1$. Advantageously, the numeric variable C' is small without the complexity of the encoded categorical array, while capturing the relationships between the categorical variable values and the target (e.g., a non-linear relationship between a categorical variable value and the target). A non-linear relationship can exist between a categorical variable and the target. For example, if a categorical variable value of 1-20 has a corresponding target value of 1 and a categorical variable value of 20-80 has a corresponding target value of 10, then a non-linear relationship exists between the categorical variable and the target. Thus, computing a prediction result with the numeric variable C' is simple, scalable, and less computational intensive.

Furthermore, a size of the numeric variable C' may not be affected by the number of the categorical variable values. For example, if the categorical variable C has a value selected from a group of 1000 values, the encoded categorical array may include 1000 array elements and may have a size of 1000 bits. In contrast, the numeric variable C', for example a 32-bit floating number, can represent the 1000 categorical variable values. Because the size of the numeric variable C' may not be affected by the number of categorical variable values, eliminating categorical variable values (or feature values) with low frequencies may be unnecessary.

In one embodiment, a prediction result can be computed using the learned machine learning model from a prediction input vector. Similar to the training data input vector, the prediction input vector can include the categorical variable C. A categorical variable value not seen in training may have no corresponding weight value. Thus, if a categorical variable value not seen in training appears in the prediction input vector, the categorical variable value may be ignored and no weight value added to the overall score for the categorical variable C.

A value of the numeric variable C' corresponding to the value of the categorical variable C of the prediction input vector can be determined. Equivalently, a corresponding weight value in the machine learning model of the value of the categorical variable C of the prediction input vector can be determined. For example, if the categorical variable C of the prediction input vector has a value of $c_2$, the numeric variable C' has a corresponding value of $w_2$. The value of the categorical variable C of the prediction input vector can be replaced with its corresponding weight value or numeric variable value to generate a substitute prediction input vector. For example, if the value of the categorical variable C in the prediction input vector is $c_2$, it can be replaced with the value of $w_2$ to generate a substitute vector. A prediction result can be computed using the substitute prediction input vector and the machine learning model. For example, the prediction result can include a predicted acquisition behavior of a user with respect to at least one of recency, frequency, or monetary behavior given input values associated with that user.

In one embodiment, small variations in the relationship between the categorical variable C and the target that may result over time can be determined by learning an updated machine learning model by learning new weight values of the updated machine learning model from retraining data. Similar to the training data, the retraining data can include the categorical variable C. With the retraining data, substitute retraining data can be generated by replacing a value of the categorical variable C of the retraining data input vector with a corresponding weight value of the original machine learning model or the numeric variable C'. With the substitute retraining data, an updated machine learning model can be learned. The updated machine learning model can include a weight value W'. For example, W' can be close to the value of one.

Learning an updated machine learning model according to aspects of the present disclosure is simplified and scalable because with the numeric variable C', the updated machine learning model is simpler while still capturing non-linear relationships between the categorical variable and the target variable. Accordingly, an updated machine learning model can be learned regularly and frequently. Advantageously, there can be feature level sparsity. For example, all weight values corresponding to categorical variable values of a categorical variable can be forced to zero. Accordingly, the categorical variable does not affect the prediction result.

In some embodiments, the categorical variable C representing a feature can have categorical variable values of $\{c_1; c_2; \ldots; c_n\}$ corresponding to feature values. Weight values $\{w_1; w_2; \ldots; w_n\}$ can be learned when learning the first stage machine learning model. The first stage machine learning model can be an intermediate machine learning model. After learning the machine learning model, a numeric variable C' representing the feature can be constructed from the weight values. A second stage machine learning model can be learned with the numeric variable C'. The second stage machine learning model can be used for computing a prediction result. The second stage machine learning model can have a weight values W. The weight value W of the second stage machine learning model can have a value of one. When computing a prediction result, the categorical variable of the prediction input vector is mapped to its numeric value. For example, the categorical variable of the prediction input vector can have a categorical variable value of $c_1$. The numeric variable C' can have the numeric value $w_1$. The numeric value $w_1$ of the numeric variable C' can be multiplied with the weight value W before being added to a prediction score when computing a prediction result. An updated machine learning model can be learned to capture the small variations in the relationship between the categorical variable C and the target that may result over time. The updated machine learning model can have a weight value W'. When computing a prediction result with the updated machine learning model, if the categorical variable of the prediction input vector has a value of $c_1$, the numeric value $w_1$ of the numeric variable C' can be multiplied by the weight value W' of the updated machine learning model before being added to a prediction score.

FIG. 1 is a flow diagram depicting an illustrative method 100 for encoding a categorical variable and learning a linear machine learning model with the encoded categorical variable. The method 100 may be embodied in a set of executable program instructions stored on a computer-readable medium, such as one or more disk drives, of a computing system, such as the computing system 300 shown in FIG. 3 and described in greater detail below. When the method 100 is initiated, the executable program instructions can be loaded into memory, such as RAM, and executed by one or more processors of the computing system 300. Although the method 100 is described with respect to the computing system 300 shown in FIG. 3, the description is illustrative only and is not intended to be limiting. In some embodiments, the process 100 or portions thereof may be performed serially or in parallel by multiple computing systems.

The illustrative method begins at block 105, where the computing system 300 obtains training data. For example, the computing system 300 may obtain training data from a training data store. Training data may be used to learn a linear machine learning model to construct a numeric variable C' from a categorical variable C. Training data may include a training data input vector and a corresponding reference data output vector. The training data may be, for example, historical data for which a result is known, which is then used to train a model to make predictions for subsequent input data. The training data input vector and the reference data output vector may comprise different numbers of elements. For example, the reference data output vector can have one element and be referred to as a reference data output value. The training data input vector may include a categorical variable C. For example, the categorical variable C can include an acquisition history of a user including one or more of recency, frequency, or monetary behavior. As one example, an acquisition history of a user with respect to recency can be one or more purchases in the previous 1-20, 21-80, or 81-100 days. An acquisition history of a user with respect to frequency can be 1-5, 6-25, or 26-30 purchases per time period, such as per month. An acquisition history of a user with respect to monetary values can be 1-1000, 1001-8000, or 8001-10000 dollars spent per time period. The corresponding reference data output value can include a subsequent acquisition history of the user with respect to at least one of recency, frequency, or monetary behavior. One element of the training data input vector and one element of the reference data output vector may relate to an acquisition history of a same item, such as a household product. Representing recency, frequency, or monetary behavior as categorical variables can be advantageous because there may not be a linear relationship between the amounts of money spent in different time periods.

Next, at block 110, the computing system 300 can encode a value of the categorical variable C of the training data input vector as an encoded categorical array. The categorical variable C of the training data input vector may have a value selected from a plurality of categorical variable values. For example, the categorical variable can have a value selected from a plurality of categorical variable values $\{c_1; c_2; \ldots; c_n\}$. The categorical variable values may be related to the target non-linearly. For example, the categorical variable value $c_1$ may represent a range of 1-20 and have a target value of 1, while the categorical variable value $c_2$ may represent a range of 21-80 and have a target value of 10.

Each array element of the encoded categorical array may correspond to one of the plurality of possible categorical variable values. Each array element may have a value of zero or one. The value of one denotes the value of the categorical variable of the training data input vector being the categorical variable value corresponding to the array element, while the value of zero denotes the value of the categorical variable of the training data input vector not being the categorical variable value corresponding to the array element. One array element of the encoded categorical array may have a value of one. For example, the first array element of the encoded categorical array can correspond to the categorical variable value $c_1$, the second array element can correspond to the categorical variable value $c_2$, and the nth array element can correspond to the categorical variable value $c_n$. If the categorical variable C has a value of $c_1$, the first array element of the encoded categorical array has a value of one while all other array elements of the encoded categorical array have values of zero. If the categorical variable C has a value of $c_2$, the second array element of the encoded categorical array has a value of one while all other array elements of the encoded categorical array have values of zero.

In some embodiments, at least one array element of the encoded categorical array has a non-zero value. The non-zero value denotes the value of the categorical variable of the training data input vector being the categorical variable value corresponding to the array element, while the value of zero denotes the value of the categorical variable of the training data input vector not being the categorical variable value corresponding to the array element. For example, the first array element of the encoded categorical array can correspond to the categorical variable value $c_1$, and the second array element can correspond to the categorical variable value $c_2$.

In some embodiments, the computing system 300 obtains training data that includes a training data input vector with a categorical variable encoded as an encoded categorical array. When the computing system 300 receives such training data, it does not have to encode the categorical variable as an encoded categorical array at block 110.

At block 115, the computing system 300 can generate encoded training data for learning a linear machine learning model by replacing the value of the categorical variable C of the training data input vector in the training data with the encoded categorical array. For example, if the categorical variable C has a value of $c_1$, the categorical variable can be replaced with an encoded categorical array with n array elements, where the first array element has a value of one while all other array elements have values of zero. As another example, if the categorical variable C has a value of $c_2$, the categorical variable can be replaced with an encoded categorical array with n array elements, where the second array element has a value of one while all other array elements have values of zero.

At block 120, the computing system 300 can learn a linear machine learning model, for example a linear regression model or a linear classification model, from the encoded training data with a machine learning algorithm. In some embodiments, the machine learning algorithm may be a linear regression algorithm or a linear classification algorithm. In some embodiments, the machine learning algorithm includes L2 normalization. In some embodiments, the computing system 300 can learn a non-linear machine learning model using a non-linear machine learning algorithm. For example, the non-linear machine learning model can be a quadratic machine learning model, and the computing system can learn the non-linear machine learning model using a quadratic machine learning algorithm.

The linear machine learning model can include weight values. Learning the linear machine learning model can include learning the weight values of the linear machine learning model, for example the weight values $\{w_1; w_2; \ldots; w_n\}$. In some embodiments, a number of array elements of the encoded categorical array and a number of the plurality of categorical variable values are the same. Each weight value of the linear machine learning model can correspond to one of the categorical variable values. For example, the weight value $w_1$ can correspond to the categorical variable value $c_1$, the weight value $w_2$ can correspond to the categorical variable value $c_2$, and the weight value $w_n$ can correspond to the categorical variable value $c_n$.

In some embodiments, learning the weight values of the linear machine learning model can include learning weight values of an intermediate machine learning model corresponding to the plurality of categorical variables values using the training data. The intermediate machine learning model can be less optimized because learning a machine learning model with encoded categorical array is more complex. Thus, the intermediate machine learning model can be optimized to a lower optimization threshold. After learning the weight values of the intermediate linear machine learning model, a final linear machine learning model can be learned. The final linear machine learning model can be optimized to a higher optimization threshold. Thus, it will be appreciated that, in some embodiments, the intermediate machine learning model does not need to be fully optimized initially, but may first be learned with a relatively low optimization threshold and further optimized later to learn the final linear machine learning model. Such two stage approach can advantageously reduce optimization costs.

In some embodiments, the computing system 300 can learn the weight values of the linear machine learning model by computing an output vector using the machine learning model and the training data input vector. After computing a difference between the output vector and the reference data output vector corresponding to the training data input vector, the computing system 300 can update the weight values of the machine learning model based on the difference. The computing system 300 can update the weight values to minimize the difference, in some embodiments.

Once the weight values of the linear machine learning model are learned, the computing system 300 can construct a numeric variable C' corresponding to the categorical variable C. For example, the numeric variable C' has a value of $w_1$ if the categorical variable C has a value of $c_1$. The numeric variable C' has a value of $w_2$ if the categorical variable C has a value of $c_2$. The numeric variable C' can be used in further training and prediction.

Figure 2:
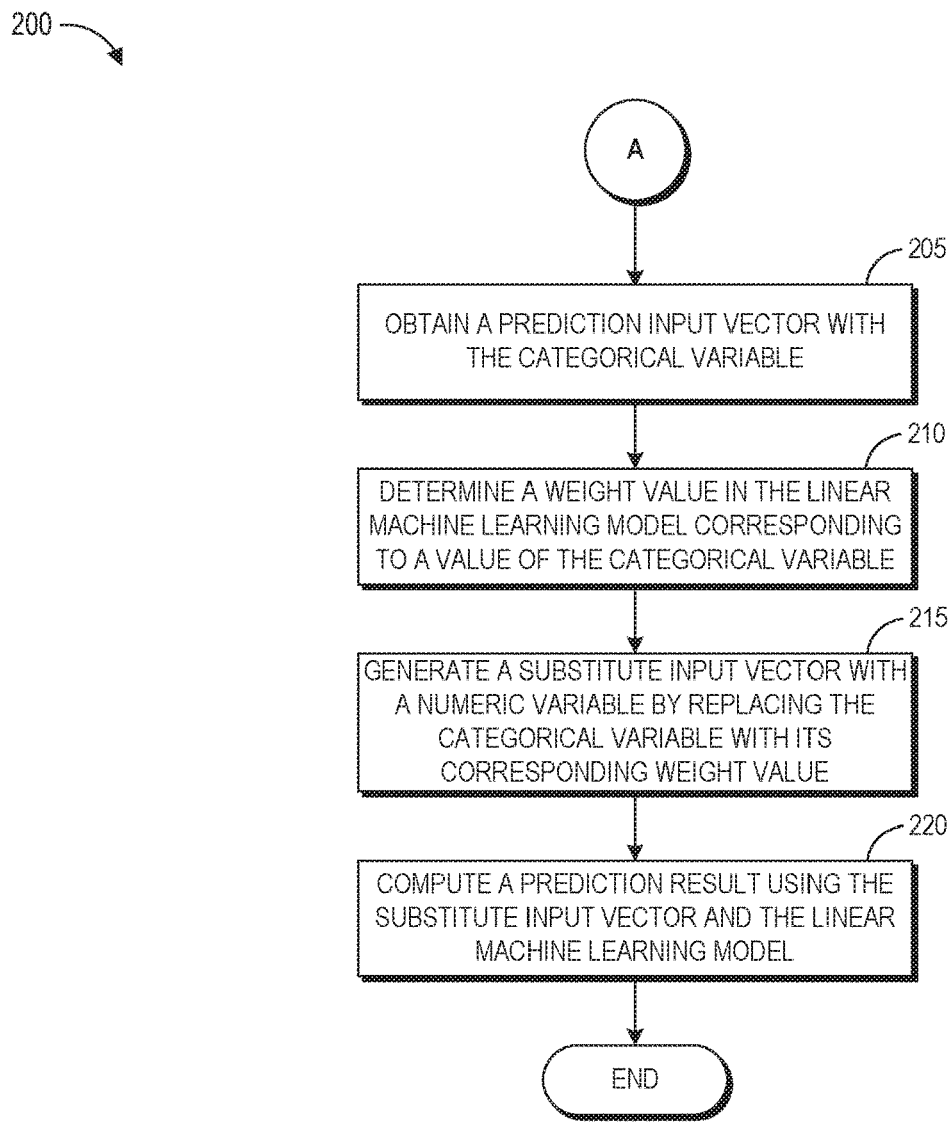
FIG. 2 is a flow diagram depicting an illustrative method for generating a substitute input vector and computing a prediction result using the substitute input vector and a machine learning model.

FIG. 2 is a flow diagram depicting an illustrative method 200 for generating a substitute input vector and computing a prediction result using the substitute input vector and a linear machine learning model. The process 200 may be embodied in a set of executable program instructions stored on a computer-readable medium, such as one or more disk drives, of a computing system, such as the computing system 300 shown in FIG. 3 and described in greater detail below. When the process 200 is initiated, the executable program instructions can be loaded into memory, such as RAM, and executed by one or more processors of the computing system 300. Although the process 200 is described with respect to the computing system 300 shown in FIG. 3, the description is illustrative only and is not intended to be limiting. In some embodiments, the process 200 or portions thereof may be performed serially or in parallel by multiple computing systems.

The illustrative method 200 may be implemented following implementation of method 100, discussed above, such that block 205 occurs subsequent to block 120 described above. At block 205, the computing system 300 can obtain a prediction input vector. Similar to the training data input vector, the prediction input vector can include the categorical variable C with a value selected from the plurality of categorical variable values $\{c_1; c_2; \ldots; c_n\}$. However, the categorical variable C of the training data input vector and the prediction input vector can have different categorical variable values. For example, the categorical variable C of the training data input vector may have a value of $c_1$, and the categorical variable C of the prediction input vector may have a value of $c_2$. The categorical variable C of another training data input vector can have the value of $c_2$. In one implementation, if no training data input vector has the categorical variable C with the value of $c_2$, the categorical variable C of the prediction input vector may not affect the prediction result.

At block 210, the computing system 300 can determine a value of the numeric variable C' corresponding to the value of the categorical variable C of the prediction input vector. Equivalently, the computing system 300 can determine a corresponding weight value in the machine learning model of the value of the categorical variable C of the prediction input vector. For example, if the categorical variable C of the prediction input vector has a value of $c_2$, the numeric variable C' has a corresponding value of $w_2$.

At block 215, the computing system 300 can generate a substitute prediction input vector with a numeric variable C' by replacing the value of the categorical variable C of the prediction input vector with its corresponding weight value or numeric variable value. For example, if the value of the categorical variable C in the prediction input vector is $c_1$, it can be replaced with the value of $w_1$ to generate a substitute vector. As another example, if the value of the categorical variable C in the prediction input vector is $c_2$, it can be replaced with the value of $w_2$ to generate a substitute vector.

In some embodiments, a size of the substitute prediction input vector may be advantageously smaller than a size of the prediction input vector with an encoded categorical variable. For example, if the encoded categorical variable can have a value selected from a plurality of n categorical variable values, then the encoded categorical variable may include n array elements each corresponding to one categorical variable value. In contrast, the substitute prediction input vector can include one corresponding numeric variable C'. Accordingly, a size of the substitute prediction input vector may be advantageously smaller than a size of the prediction input vector with an encoded categorical variable.

At block 220, the computing system 300 can compute a prediction result using the substitute prediction input vector and the machine learning model. For example, the prediction result can include a predicted acquisition behavior with respect to at least one of recency, frequency, or monetary behavior. The training data input vector and the prediction input vector can be of the same user or different users. For example, the training data input vector and the prediction input vector can include acquisition histories of the same user during different time periods. Thus, the prediction result can include a predicted acquisition behavior of the user during a subsequent time period. As another example, the training data input vector can include an acquisition history of a first user, and the prediction input vector can include an acquisition history of a second user. Thus, the prediction result can include a predicted acquisition behavior of the second user during a subsequent time period. It will be appreciated that these examples are for illustrative purposes only, and that the input and output data may be from any of a wide variety of fields for which machine learning can be used for prediction.

In some embodiments, the computing system 300 can advantageously compute the prediction result using the substitute prediction input vector and the machine learning model in less computing time than computing the prediction result using the prediction input vector and the first machine learning model. For example, if the encoded categorical variable has a value selected from a plurality of n categorical variable values, then the encoded categorical array may include n array elements each corresponding to one categorical variable value. Thus, the computing system 300 needs to execute at least n multiplication operations and n−1 addition operations when computing a prediction result from the encoded categorical array. In contrast, the substitute prediction input vector can include one corresponding numeric variable C' which is smaller than the encoded categorical array with n array elements. Thus, the computing system 300 needs to execute one addition operation when computing a prediction result from the numeric variable C'. For example, the computing system 300 can add the corresponding weight value of the substitute input vector to a constant value of the machine learning model. The numeric variable C' is small without the complexity of the encoded categorical array and the complexity of the linear machine learning model while still capturing the relationships (both linear and non-linear relationships) between the categorical variable values. Thus, computing prediction results with the numeric variable C' is simple and scalable. And the computing system 300 can advantageously compute the prediction result using the substitute prediction input vector in less computing time than using the prediction input vector. The computing system 300 can learn an updated machine learning model with the numerical variable C' in a simple and scalable manner because the categorical variable C' does not have to be encoded as an encoded categorical array. Advantageously, there can be feature level sparsity. For example, all weight values corresponding categorical variable values of a categorical variable can be forced to zero. Accordingly, the categorical variable does not affect the prediction result.

Furthermore, a size of the numeric variable C' may not be affected by the number of the categorical variable values. For example, if the categorical variable C has a value selected from a group of 1000 values, the encoded categorical array may include 1000 array elements and may have a size of 1000 bits. In contrast, the numeric variable C', for example a 32-bit floating number, can represent the 1000 categorical variable values. Because the size of the numeric variable C' may not be affected by the number of categorical variable values, eliminating categorical variable values (or feature values) with low frequencies may be unnecessary. Thus feature level sparsity is not a problem for the categorical variable C.

In one embodiment, small variations in the in the relationship between the categorical variable and the target that may result over time can be determined by learning an updated machine learning model, which includes learning new weight values of the for the numeric variable C' created from the categorical variable C. The computing system 300 can learn the updated machine learning model by obtaining retraining data. The retraining data can be similar to the training data used to learn the original machine learning model. For example, the retraining data can include a retraining data input vector and a corresponding retraining reference data output value. The retraining data input vector can include the categorical variable C.

With the retraining data, the computing system 300 can generate substitute retraining data by replacing a value of the categorical variable C of the retraining data input vector with a corresponding weight value of the original machine learning model or the numeric variable C'. For example, the categorical variable of the retraining data input vector may have a value of $c_2$. Because the categorical variable value $c_2$ corresponds to the weight value $w_2$ in the original machine learning model or the numeric variable value $w_2$, the computing system 300 can replace the value of the categorical variable with the weight value $w_2$ in the substitute retraining data.

With the substitute retraining data, the computing system 300 can learn an updated linear machine learning model regularly, for example daily, weekly, monthly, or yearly, using a linear machine learning algorithm. In the updated linear machine learning model, the updated numeric variable C' can have one of a plurality of weight values $\{w_1'; w_2'; \ldots; w_n'\}$ of the updated linear machine learning model corresponding to the categorical variable values $\{c_1; c_2; \ldots; c_n\}$. For example, if the categorical variable C has a value of $c_1$, the updated numeric variable C' of the updated machine learning model has a value of $w_1'$. As another example, if the categorical variable C has a value of $c_1$, the updated numeric variable C' of the updated machine learning model has a value of $w_1'$. Because the numeric variable C' is small and simple, the computing system 300 can advantageously learn an updated machine learning model regularly and efficiently.

In some embodiments, after transforming the categorical variable C to the numeric variable C', the computing system 300 can learn a new model on the same training data (albeit with the categorical variable C transformed to the numeric variable C'). The weight value learned for the numeric variable C' can be one or close to one. Any small variations in the feature-target relationship in new training data can be captured by learning a new weight value for the numeric variable C'. The weight value may not be one or close to one. Because when learning the updated machine learning model, only one weight value has to be learned, the computing system 300 can advantageously learn an updated machine learning model regularly and efficiently.

In some embodiments, the methods disclosed herein can solve the problem of sparsity. For selecting or ranking important categorical variable values (or feature values) in building machine learning models, regularization such as L1 regularization may be used. Regularization may lead to sparsity at the token level, thus categorical variable values (or feature values) of a categorical variable may be forced to values of zero and can be removed. Because of sparsity at the token level, some or a majority of the categorical variable values (or feature values) of the categorical variable may have zero weight values. Thus, deciding whether to eliminate these categorical variable values (or feature values) is difficult. Group Lasso (L1/L2) may not solve the sparsity problem for all situations. Furthermore, Group Lasso (L1/L2) may be inefficient and can be computationally expensive. Constructing the numeric variable C' corresponding to the categorical variable C disclosed herein can solve the sparsity problem efficiently.

Figure 3:
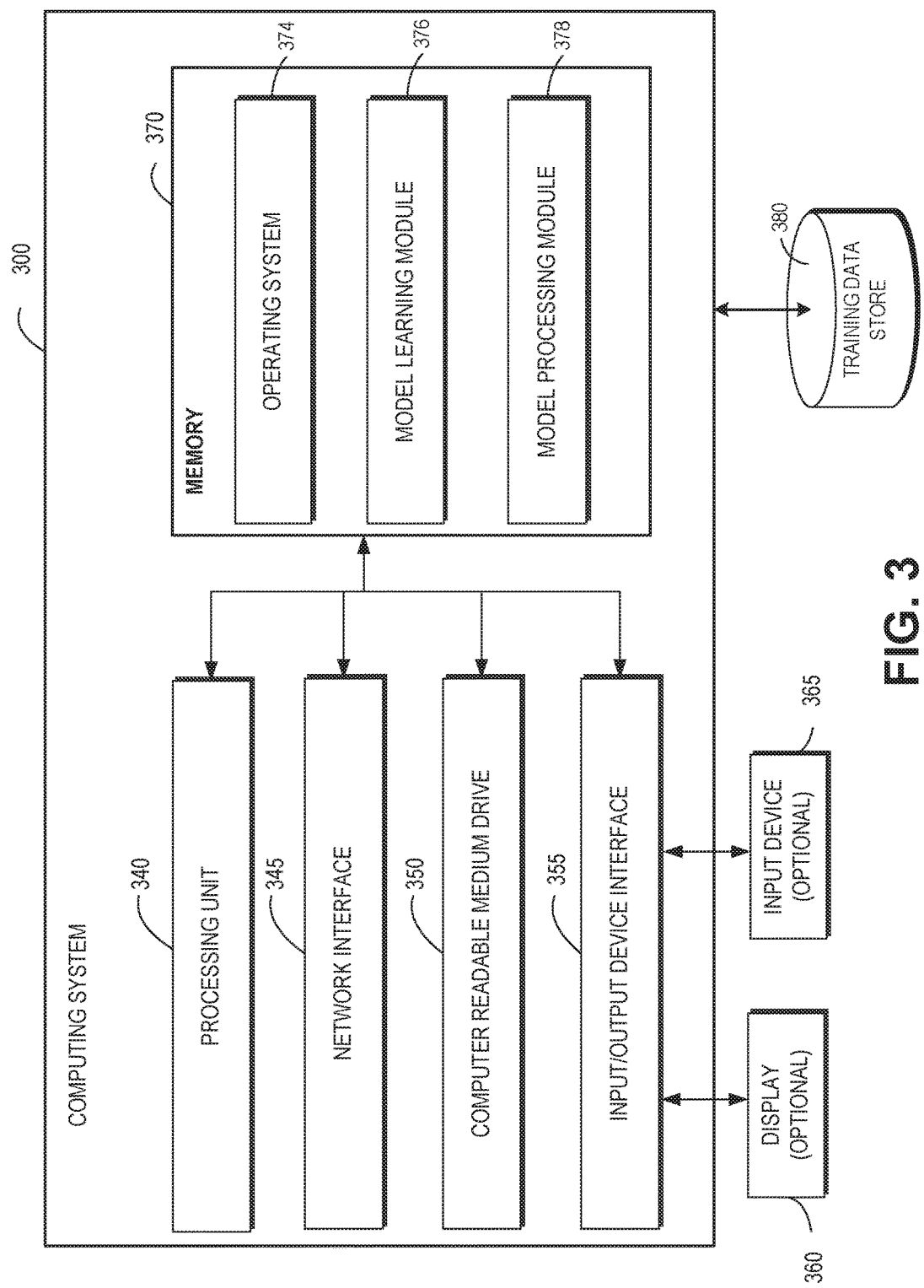
FIG. 3 depicts a general architecture of an example computing device configured to learn a machine learning model and compute a prediction result using the model.

FIG. 3 depicts a general architecture of an example computing device 300 configured to learn a machine learning model and compute a prediction result using the model. The general architecture of the computing device 300 depicted in FIG. 3 includes an arrangement of computer hardware and software components. The computing device 300 may include many more (or fewer) elements than those shown in FIG. 3. It is not necessary, however, that all of these generally conventional elements be shown in order to provide an enabling disclosure. As illustrated, the computing device 300 includes a processing unit 340, a network interface 345, a computer readable medium drive 350, an input/output device interface 355, a display 360, and an input device 365, all of which may communicate with one another by way of a communication bus. The network interface 345 may provide connectivity to one or more networks or computing systems. The processing unit 340 may thus receive information and instructions from other computing systems or services via a network. The processing unit 340 may also communicate to and from memory 370 and further provide output information for an optional display 360 via the input/output device interface 355. The input/output device interface 355 may also accept input from the optional input device 365, such as a keyboard, mouse, digital pen, microphone, touch screen, gesture recognition system, voice recognition system, gamepad, accelerometer, gyroscope, or other input device.

The memory 370 may contain computer program instructions (grouped as modules or components in some embodiments) that the processing unit 340 executes in order to implement one or more embodiments. The memory 370 generally includes RAM, ROM and/or other persistent, auxiliary or non-transitory computer-readable media. The memory 370 may store an operating system 374 that provides computer program instructions for use by the processing unit 340 in the general administration and operation of the computing device 300. The memory 370 may further include computer program instructions and other information for implementing aspects of the present disclosure. For example, in one embodiment, the memory 370 includes a model learning module 376 that learns a machine learning model or an updated machine learning model from training data. In another embodiment, the memory 370 includes a model processing module 378 that computes a prediction result from a prediction input vector and a machine learning model, such as a machine learning model learned by the model learning module 376. In addition, memory 370 may include or communicate with training data store 380 and/or one or more other data stores that stores training data or retraining data.

Figure 4:
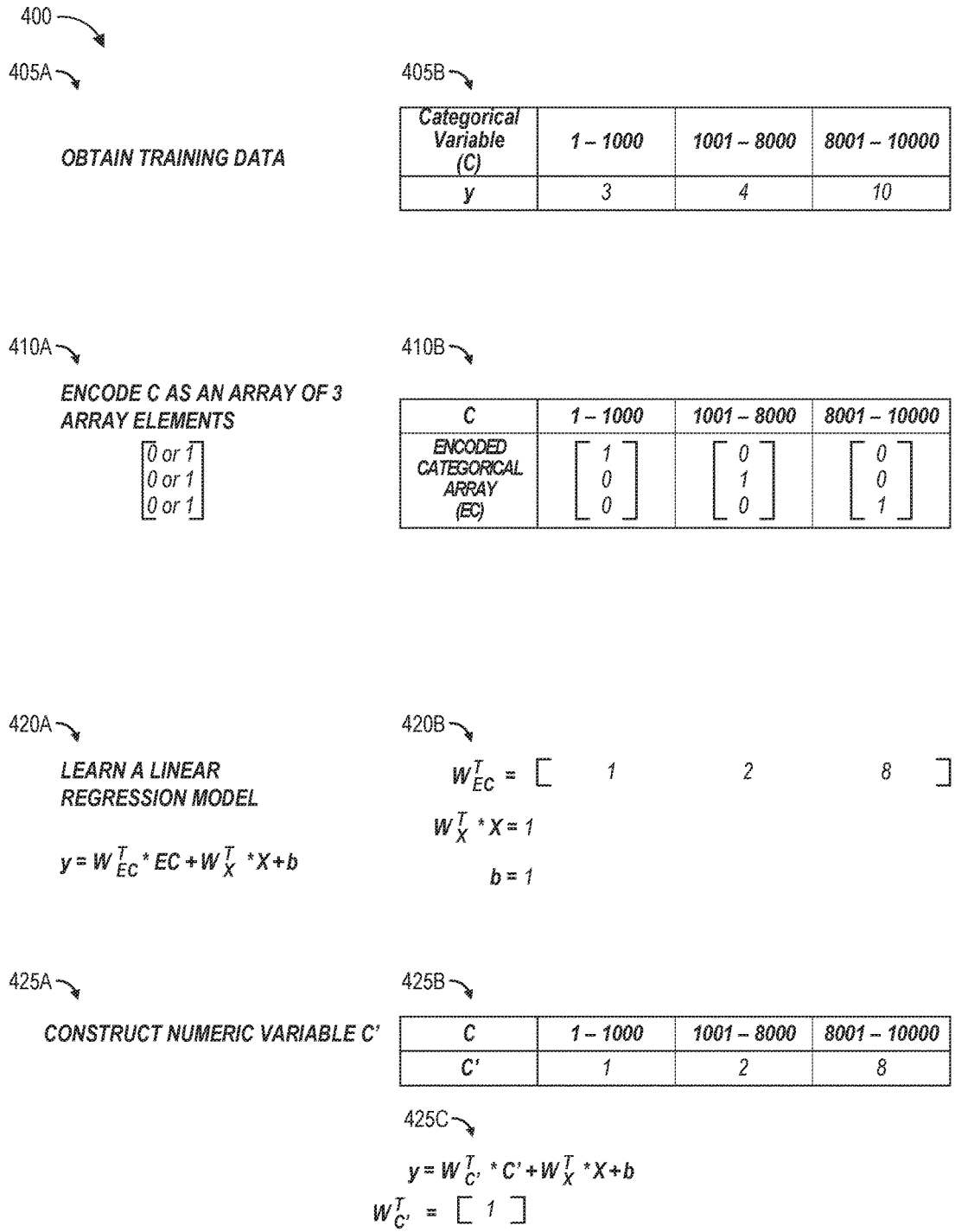
FIG. 4 depicts an illustrative example process of learning a linear machine learning model with one categorical variable.

FIG. 4 depicts an illustrative example method 400 of learning a linear machine learning model with one categorical variable. The method 400 may be embodied in a set of executable program instructions stored on a computer-readable medium, such as one or more disk drives, of a computing system, such as the computing system 300 shown in FIG. 3 and described in greater detail below.

The illustrative method begins at step 405A, where the computing system 300 obtains training data, such as from training data store 380. Example training data shown at 405B include three training data input vectors of users and three corresponding reference data output values. Each training data input vector includes a categorical variable C. The categorical variable C includes an acquisition history of a user with respect to monetary values: 1-1000, 1001-8000, or 8001-10000 (which may represent an amount of dollars spent). Each corresponding reference data output value y includes a subsequent acquisition history of a user with respect to frequency: 3, 4, or 10 purchases per time period, such as per month. Thus, the monetary values are not related to the reference data output values, the values of the target variable, linearly.

Next, at step 410A, the computing system 300 encodes a value of the categorical variable C of each training data input vector as an encoded categorical array EC with three array elements. Each array element of the encoded categorical array EC corresponds to one value of the categorical variable C. The first array element corresponds to the monetary value of 1-1000, the second array element corresponds to the monetary value of 1001-8000, and the third array element corresponds to the monetary value of 8001-10000. Each array element has a value of zero or one. The encoded categorical array EC shown at 410B has a value of $$\begin{bmatrix}1\\0\\0\end{bmatrix}$$

if the categorical variable C has a monetary value of 1-1000. The encoded categorical array EC has a value of $$\begin{bmatrix}0\\1\\0\end{bmatrix}$$

if the categorical variable C has a monetary value of 1001-8000. The encoded categorical array EC has a value of $$\begin{bmatrix}0\\0\\1\end{bmatrix}$$

if the categorical variable C has a monetary value of 8001-10000.

At step 420A, the computing system 300 can learn a linear regression model from the encoded categorical array EC. The linear regression model can be represented by [1] below.

$$y = W_{EC}^T * EC + W_X^T * X + b, \quad [1]$$

where $W_{EC}^T$ represents the transpose of a weight matrix for the encoded categorical array EC of the linear regression model, X represents non-categorical variables (e.g., numeric variables) of the linear regression model, $W_X^T$ represents the transpose of a weight matrix for the non-categorical variables X of the linear regression model, and b represents a constant value of the linear regression model. The computing system 300 can learn the weight matrix $W_{EC}^T = [1\ 2\ 8]$, $W_X^T * X = 1$, and the constant value b=1 shown at 420B.

At step 425A, the computing system 300 can construct a numeric variable C' corresponding to the categorical variable C from the weight matrix $W_{EC}$. As shown at 425B, the numeric variable C' has a value of 1, the first element of the weight matrix $W_{EC}$, if the categorical variable C has the monetary value of 1-1000. The numeric variable C' has a value of 2, the second element of the weight matrix $W_{EC}$, if the categorical variable C has the monetary value of 1001-8000. The numeric variable C' has a value of 8, the third element of the weight matrix $W_{EC}$, if the categorical variable C has the monetary value of 8001-10000.

The linear regression model, as shown at 425C, can be represented by [2] below.

$$y = W_{C'}^T * C' + W_X^T * X + b, \quad [2]$$

where $W_{C'}^T$ represents a matrix for the numeric variable C' of the linear regression model. The matrix $W_{C'}^T$ has an element with the value of one. Thus, to compute a prediction result using the linear regression model represented by [2] above, the computing system 300 executes one addition operation (and other operations involving the non-categorical variables X). In contrast, to compute a prediction result using the linear regression model represented by [1] above, the computing system 300 may execute three multiplication operations and two addition operations (and other operations involving the non-categorical variables X).

Figure 5:
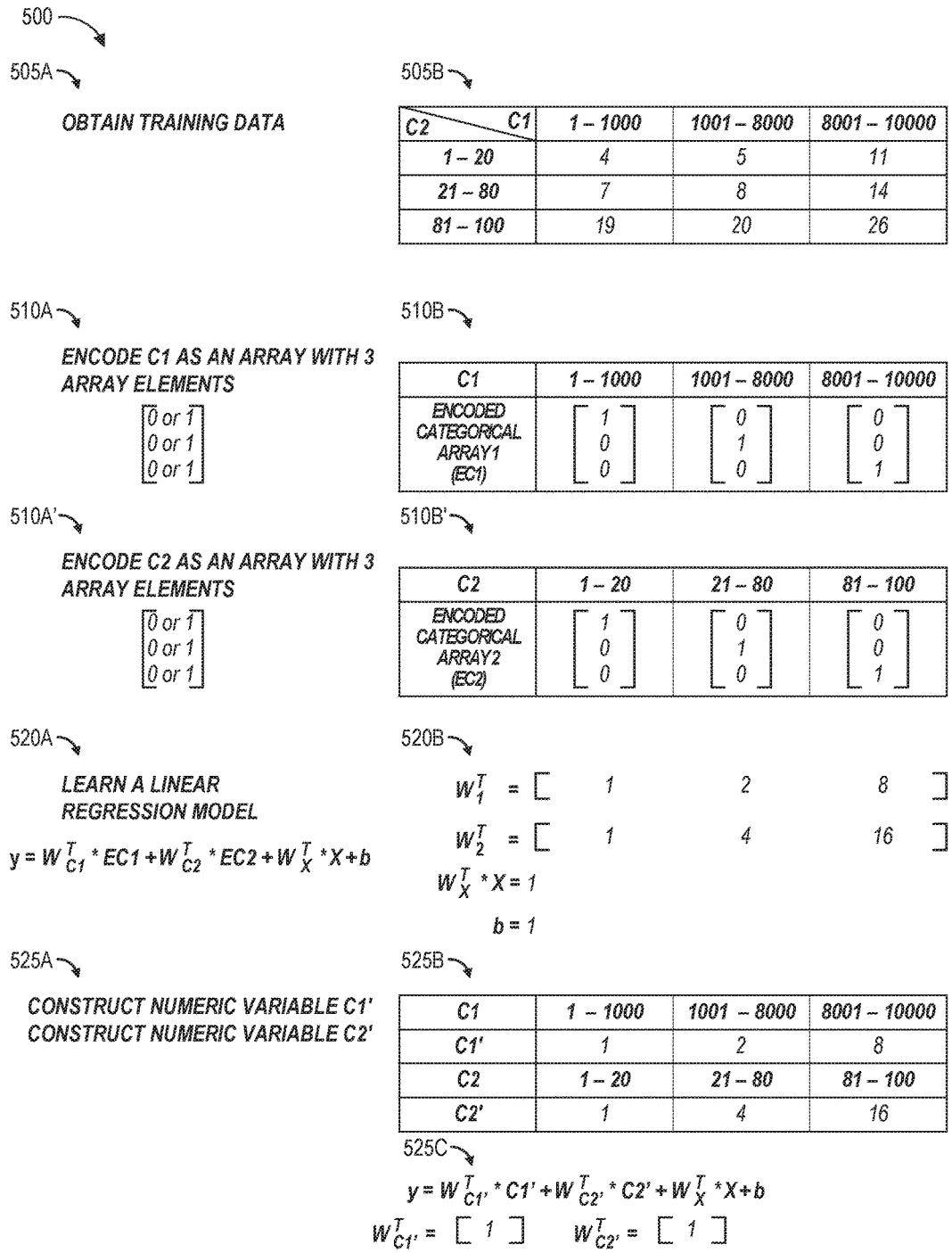
FIG. 5 depicts an illustrative example process of learning a linear machine learning model with two categorical variables.

FIG. 5 depicts an illustrative example process 500 of learning a linear machine learning model with two categorical variables. The method 500 may be embodied in a set of executable program instructions stored on a computer-readable medium, such as one or more disk drives, of a computing system, such as the computing system 300 shown in FIG. 3 and described in greater detail below.

The illustrative method begins at step 505A, where the computing system 300 obtains training data, such as from training data store 380. Example training data shown at 505B includes nine training data input vectors of users and nine corresponding reference data output values. Each training data input vector X includes two categorical variables C1 and C2. The categorical variable C1 includes an acquisition history of a user with respect to monetary values: 1-1000, 1001-8000, or 8001-10000 (which may represent an amount of dollars spent). The categorical variable C2 includes an acquisition history of a user with respect to recency: one or more purchases in the previous 1-20, 21-80, or 81-100 days. Each corresponding reference data output value y includes a subsequent acquisition history of a user with respect to frequency: 3, 4, 10, 6, 7, 13, 18, 19, or 25 purchases per time period.

Next, at step 510A, the computing system 300 encodes a value of the categorical variable C1 of each training data input vector as an encoded categorical array EC1 with three array elements. Each array element of the encoded categorical array EC1 corresponds to one value of the categorical variable C1. The first array element corresponds to the monetary value of 1-1000, the second array element corresponds to the monetary value of 1001-8000, and the third array element corresponds to the monetary value of 8001-10000. Each array element has a value of zero or one. The encoded categorical array EC1 shown at 510B has a value of $$\begin{bmatrix} 1 \\ 0 \\ 0 \end{bmatrix}$$

if the categorical variable C1 has the monetary value of 1-1000. The encoded categorical array EC1 has a value of $$\begin{bmatrix} 0 \\ 1 \\ 0 \end{bmatrix}$$

if the categorical variable C1 has the monetary value of 1001-8000. The encoded categorical array EC1 has a value of $$\begin{bmatrix} 0 \\ 0 \\ 1 \end{bmatrix}$$

if the categorical variable C1 has the monetary value of 8001-10000.

Next, at step 510A', the computing system 300 encodes a value of the categorical variable C2 of each training data input vector as an encoded categorical array EC2 with three array elements. Each array element of the encoded categorical array EC2 corresponds to one value of the categorical variable C2. The first array element corresponds to the recency value of 1-20, the second array element corresponds to the recency value of 21-80, and the third array element corresponds to the recency value of 81-100. Each array element has a value of zero or one. The encoded categorical array EC2 shown at 510B' has a value of $$\begin{bmatrix} 1 \\ 0 \\ 0 \end{bmatrix}$$

if the categorical variable C2 has the recency value of 1-20. The encoded categorical array EC2 has a value of $$\begin{bmatrix} 0 \\ 1 \\ 0 \end{bmatrix}$$

if the categorical variable C2 has the recency value of 21-80. The encoded categorical array EC2 has a value of $$\begin{bmatrix} 0 \\ 0 \\ 1 \end{bmatrix}$$

if the categorical variable C2 has the recency value of 81-100.

At step 520A, the computing system 300 can learn a linear regression model from the encoded categorical arrays EC1 and EC2. The linear regression model can be represented by [3] below.

$$y = W_{C1}^T * C1 + W_{C2}^T * C2 + W_X^T * X + b, \quad [3]$$

where $W_{C1}^T$ represents the transpose of a weight matrix for the categorical variable C1 of the linear regression model, $W_{C2}^T$ represents the transpose of a weight matrix for the categorical variable C2 of the linear regression model, X represents non-categorical variables (e.g., numeric variables) of the linear regression model, $W_X^T$ represents the transpose of a weight matrix for the non-categorical variables X of the linear regression model, and b represents a constant value of the linear regression model. The computing system 300 can learn the weight matrix W1=[1 2 8], the weight matrix W2=[1 4 16], and the constant value b=1 shown at 520B'.

At step 525A, the computing system 300 can construct a numeric variable C1' corresponding to the categorical variable C1 from the weight matrix $W_{C1}^T$ and a numeric variable C2' corresponding to the categorical variable C2 from the weight matrix $W_{C2}^T$. As shown at 525B, the numeric variable C1' has a value of 1, the first element of the weight matrix $W_{C1}^T$, if the categorical variable C1 has the monetary value of 1-1000. The numeric variable C1' has a value of 2, the second element of the weight matrix $W_{C1}^T$, if the categorical variable C1 has the monetary value of 1001-8000. The numeric variable C1' has a value of 8, the third element of the weight matrix $W_{C1}^T$, if the categorical variable C1 has the monetary value of 8001-10000. The numeric variable C2' has a value of 1, the first element of the weight matrix $W_{C2}^T$, if the categorical variable C2 has the recency value of 1-20. The numeric variable C2' has a value of 4, the second element of the weight matrix $W_{C2}^T$, if the categorical variable C2 has the recency value of 21-80. The numeric variable C2' has a value of 8, the third element of the weight matrix $W_{C2'}^T$, if the categorical variable C2 has the recency value of 81-100.

The linear regression model, as shown at 525C, can be represented by [4] below.

$$y = W_{C1'}^T * C1' + W_{C2'}^T * C2' + W_X^T * X + b, \quad [4]$$

where $W_{C1'}^T$ represents a matrix for the numeric variable C1' of the linear regression model, and where $W_{C2'}^T$ represents a matrix for the numeric variable C2' of the linear regression model. Thus, to compute a prediction result using the linear regression model represented by [4] above, the computing system 300 executes two addition operations (and other operations involving the non-categorical variables X). In contrast, to compute a prediction result using the linear regression model represented by [1] above, the computing system 300 may execute six multiplication operations and five addition operations (and other operations involving the non-categorical variables X).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
obtaining training data comprising a training data input vector and a corresponding reference data output vector, wherein the training data input vector comprises a categorical variable encoded as an encoded categorical array, and wherein a value of the categorical variable is selected from a plurality of categorical variable values;
learning a weight value of a first machine learning model corresponding to each of the plurality of categorical variable values using the training data;
training a second machine learning model using substitute training data, wherein the categorical variable of the training data input vector is replaced in the substitute training data with a corresponding weight value learned by the first machine learning model;
subsequent to the training of the second machine learning model, obtaining a prediction input vector for which a prediction result is to be determined, wherein the prediction input vector comprises the categorical variable;
replacing the value of the categorical variable of the prediction input vector with a value of a numeric variable to generate a substitute prediction input vector, wherein the value of the numeric variable is a weight value in the first machine learning model corresponding to a value of the categorical variable of the prediction input vector; and
determining the prediction result by providing the substitute prediction input vector to the second machine learning model.

2. The method of claim 1, wherein an array element of the encoded categorical array corresponds to one of the plurality of categorical variable values, wherein the array element having a value of zero denotes the value of the categorical variable of the training data input vector is not the categorical variable value corresponding to the array element, and wherein at least one array element of the encoded categorical array has a non-zero value.

3. The method of claim 1, wherein the reference data output vector and the plurality of categorical variable values are related to each other by a non-linear relationship.

4. The method of claim 1, wherein a size of the numeric variable is smaller than a size of the encoded categorical array.

5. The method of claim 1, wherein determining the prediction result by providing the substitute prediction input vector to the second machine learning model requires less computing time than would be required to determine the prediction result by providing the prediction input vector to the first machine learning model.

6. The method of claim 1, wherein a majority of weight values of the first machine learning model have zero values.

7. The method of claim 1, wherein the first machine learning model is a non-linear model, and wherein learning the weight value of the first machine learning model corresponding to each of the plurality of categorical variable values using the encoded training data comprises learning the first machine learning model using a non-linear machine learning algorithm.

8. The method of claim 7, wherein the second machine learning model is a linear machine learning model.

9. The method of claim 1, wherein learning the weight value of the first machine learning model corresponding to each of the plurality of categorical variable values using the training data comprises:
computing an output vector using the first machine learning model and the training data input vector;
computing a difference between the output vector and the reference data output vector corresponding to the training data input vector; and
updating the weight value of the first machine learning model using the difference.

10. The method of claim 1, wherein the training data input vector and the reference data output vector comprise different numbers of elements.

11. The method of claim 1, wherein one element of the training data input vector and one element of the reference data output vector relate to an acquisition history of a same item.

12. The method of claim 1, wherein the training data input vector comprises a first acquisition history of a first user during a first time period, and wherein the reference data output vector corresponding to the training data input vector comprises a second acquisition history of the first user during a second time period, and wherein the second time period is subsequent to the first time period.

13. The method of claim 12, wherein the prediction input vector comprises a third acquisition history of the first user or a second user during a third time period, wherein the prediction result comprises a predicted acquisition behavior of the first user during a fourth time period, and wherein the fourth time period is subsequent to the third time period.

14. A system comprising:
a hardware processor configured to execute computer-executable instructions to at least:
obtain training data comprising a training data input vector and a corresponding reference data output vector, wherein the training data input vector comprises a categorical variable encoded as an encoded categorical array, and wherein a value of the categorical variable is selected from a plurality of categorical variable values;
learn a weight value of a first machine learning model corresponding to each of the plurality of categorical variable values using the training data;
train a second machine learning model using substitute training data, wherein the categorical variable of the training data input vector is replaced in the substitute training data with a corresponding weight value learned by the first machine learning model;
obtain a prediction input vector for which a prediction result is to be determined, wherein the prediction input vector comprises the categorical variable;
replace the value of the categorical variable of the prediction input vector with a numeric value to generate a substitute prediction input vector, wherein the numeric value is a weight value in the first machine learning model corresponding to a value of the categorical variable of the prediction input vector; and
determine the prediction result by providing the substitute prediction input vector to the second machine learning model.

15. The system of claim 14, wherein the prediction input vector comprises an acquisition history of a user during a time period, and wherein the prediction result comprises a predicted acquisition behavior of the user during a subsequent time period.

16. The system of claim 14, wherein the categorical variable comprises a first acquisition history of a user including one or more of recency, frequency, or monetary elements, and wherein the prediction result comprises a predicted acquisition behavior with respect to at least one of recency, frequency, or monetary behavior.

17. The system of claim 14, wherein the first machine learning model is a non-linear model, and wherein the second machine learning model is a linear model.

18. The system of claim 14, wherein the second machine learning model applies one of linear regression or linear classification.

\* \* \* \* \*